Figure 1:
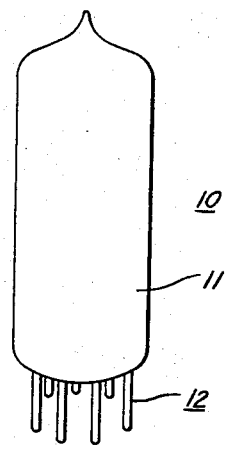

Oct. 8, 1968  K. L. ROHRER  3,404,968
GLASS-TO-METAL SEALS AND METHOD FOR MAKING SAME
Filed Sept. 30, 1964

INVENTOR
Kenneth L. Rohrer
BY
Charles F. Renz
ATTORNEY

United States Patent Office 3,404,968
Patented Oct. 8, 1968

3,404,968
GLASS-TO-METAL SEALS AND METHOD
FOR MAKING SAME
Kenneth L. Rohrer, Horseheads, N.Y., assignor to Westinghouse Electric Corporation, East Pittsburgh, Pa., a corporation of Pennsylvania
Filed Sept. 30, 1964, Ser. No. 400,388
7 Claims. (Cl. 29—195)

This invention relates to articles and methods of manufacturing glass-to-metal seals, and more specifically, to articles and methods of providing an adherent layer on a metal article to insure a more effective seal.

In the manufacture of electron tubes, metal articles such as terminal leads are integrally secured with and through the glass envelopes of such devices. It is necessary to provide a seal between the glass and the metal articles that will remain vacuum tight after sealing, during tube processing and during the operational life of the tube.

Metal embrittlement and disintegration by oxidation are serious problems associated with the manufacture of glass-to-metal seals. This problem is especially acute with easily oxidizable refractory metals such as molybdenum and tungsten. During the sealing of metal to glass, a rapid oxidation or burning will often occur thereby deteriorating or seriously weakening these metal articles. Further, such oxidation tends to form loosely adherent oxide layers to which it is difficult to form strong, leak-tight glass to metal seals.

One obvious method of eliminating these defects of deterioration would be to conduct the various processes of manufacturing electron tubes or other such devices in a protective atmosphere. However, the use of inert gases is not feasible in mass production where cost is a determinative factor such as in the manufacture of electron tubes.

In recent years, the designers of electron tubes have substantially eliminated the oxidation problem by the use of diffused chromium alloys which provide, when oxidized in wet hydrogen, adequate oxidation resistance to further heat treatments (i.e. direct flame sealing of the envelope at 1200 to 1300° C., or extended high temperature bakeout or degassing). These diffusion processes, commonly termed chromizing or chromatizing, are usually effected by packing and cementation of the chromium about the metal article which is then subjected to high temperatures. Further, it has been found that a layer of chromium oxide provides a surface to which glass tenaciously adheres. However, some refractory metals, notably molybdenum, tend to embrittle when the layer of chrome is diffused and oxidized. It has been theorized that embrittlement is due to an additive effect of interstitial contamination both by chromium or its reaction products and by recrystallization at elevated temperatures during diffusion and oxidation. Upon test at room temperature, the molybdenum, due to its embrittlement, cannot be flexed or bent and therefore provides an unsatisfactory terminal lead for an electron tube.

It is, therefore, an object of this invention to provide an improved article and method for providing a glass-to-metal seal.

A further object of this invention is to provide an improved article and method of forming a glass-to-metal seal in which the metal article retains a resistance to the deleterious effects of oxidation during further heat treating.

A still further object of this invention is to provide an improved article and method of manufacturing a glass-to-metal seal wherein the metal portion remains ductile and flexible even after further heat treating.

Another object of this invention is to provide an article and method of manufacturing electron tubes wherein the terminal leads maintain their characteristics of ductility and mechanical strength.

Stated briefly, the present invention describes a glass-to-metal seal employing a first layer of an alloy of nickel and chromium disposed about a metal article and a second layer of chromium oxide formed on said first layer and secured to a glass article. The first layer is formed by depositing a mixture of nickel oxide and chromium oxide in an appropriate carrier and then sintering the layer in a reducing atmosphere. The second layer of chromium oxide is formed by preferentially oxidizing said first layer.

Further objects and advantages of the invention will become apparent as the following description proceeds and features of novelty which characterize the invention will be pointed out in particularity in the claims annexed hereto and forming a part of this specification.

Figure 2:
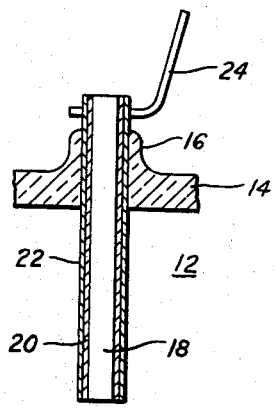

For a better understanding of the invention, reference may be had to the accompanying drawings, in which:

FIGURE 1 is a view of an electron tube having terminal leads which embody this invention; and FIG. 2 is an enlarged sectional view of the electron tube shown in FIG. 1.

Referring in detail to FIGS. 1 and 2, an electron tube 10 is shown which embodies the glass-to-metal seal of this invention. More specifically, a plurality of metallic terminal leads 12 are sealed or secured within an envelope 11 of the electron tube 10. In FIG. 2, one of the terminal leads 12 is secured within a stem or base 14 of the envelope 11. A bead portion 16 is bonded integrally with the base 14 and with the terminal lead 12. As will be explained later, a nickel chromium alloy (nichrome) layer 20 is formed about a core section 18 of the terminal lead 12. Though, primarily this invention applies to the use of a molybdenum core section 18, the teachings of this invention could be applied to other metals such as tungsten, Kovar (Westinghouse Electric Corporation trademark for an alloy of nickel, iron and cobalt), other ferrous metals, and alloys thereof. In addition, layer 20 could be formed of an alloy of chromium, and iron or cobalt. Further, a layer or surface region 22 of chromium oxide is formed concentrically about the layer 20 to provide a tenacious seal between the glass of the envelope 11 and the core section 18. An interconnecting lead 24 is secured to one end of the terminal leads 12 by such methods as are well known in the art such as welding to provide interconnection with the electrode elements (not shown) within the envelope 11.

An example

A particular embodiment or example of the process by which the alloy of chromium and nickel is applied to the terminal leads 12 will now be given. First, the core section 18 of molybdenum is thoroughly cleaned by etching. Etching in a solution of potassium hydroxide and potassium ferricyanide for a period of approximately 10 minutes at room temperature has been found satisfactory. More specifically, the etching solution into which the leads 12 are immersed is comprised of 300 grams of potassium ferricyanide and 100 grams of potassium hydroxide dissolved in a liter of water. Secondly, after the core section 18 of molybdenum has been thoroughly cleaned, a layer of chromium oxide and nickel oxide is applied to the core section 18 by those methods well known in the art such as painting, dipping, spraying or by slurry techniques. For spraying, a mixture of 77% nickel oxide and 23% chromium oxide slurried in 1% nitrocellulose dissolved in a N-butyl acetate vehicle has proven satisfactory. It is noted that pure nickel and pure chromium were found difficult to place in a slurry form because of the tendency of these elements to settle out of the liquid vehicle; on the other hand, nickel oxide and chromium oxide could be dispersed easily in a slurry suspension. Third, the lead 12 coated with a mixture of chromium oxide and nickel oxide is sintered in a dry cracked ammonia (ammo) gas at a temperature of approximately 1100° to 1150° C. for a period of approximately 10 minutes to thereby allow the oxides to alloy and to fuse with the molybdenum core section 18. Further, it has been found that adequate sintering of layer 20 does not appear to take place below 1050° C. and that sintering for a period of greater than 30 minutes tends to produce undue embrittlement of the core section 18. It is noted that a ratio of 77% nickel oxide to 23% chromium oxide when sintered would provide a nichrome layer 20 having a ratio of approximately 79% nickel and 21% chromium, which appears to provide optimum adhesion between the glass of envelope 11 and the lead 12. When an excessively high proportion of chromium is added, adherence of the oxidized nichrome layer to the glass bond portion 16 deteriorates. When an excessively high proportion of nickel is added, the chromium oxide which is provided (as will be explained later) to obtain an optimum sealing layer does not readily form during oxidation. During a series of experiments, it was found that the proportion of nickel oxide could be varied between 50 and 85% and yet obtain satisfactory sealing. The appearance of layer 20 at this point in the process is suggestive of a white metallic alloy, Fourth, the lead 12 with a nichrome layer 20 thereon is preferentially oxidized for approximately 5 minutes at a temperature of approximately 1100° C. in an atmosphere of wet hydrogen or cracked ammonia gas having a dew point of approximately +10° C. The oxidation process is interdependent on the temperature, time duration and dewpoint at which the process is conducted. By accurately controlling these factors, a layer or region 22 of chromium oxide of appropriate thickness may be formed without unduly embrittling the core section 18. By providing a heavier proportion of moisture in the oxidizing atmosphere, a more complete oxidation of the chromium will take place. A dewpoint above 25° C. tends to produce embrittlement of the core section 18. In addition, an oxidation period in excess of 15 minutes tends to produce undue embrittlement, while at temperatures below 1000° C., little or no oxidation takes place.

It is noted that FIG. 2 is only illustrative of the layers placed on the core section 18 and that the dimensions of the various layers shown are much smaller. The layer 20 of nickel oxide and chromium oxide as originally applied is approximately ½ of a mil in thickness. The layer 20 after it has been sintered decreases in thickness to approximately ¼ mil. It is of particular interest to note that when the lead 12 is subjected to an oxidizing atmosphere, the chromium oxide forms only on the surface (i.e., layer 22). The chromium oxide layer 22 has a thickness of approximately a few molecules and an appearance of the green color which is characteristic of a good chromium oxide sealing surface.

After the chromium oxide layer 22 has been formed upon the lead 12, a bead of glass is molded and fused about the lead 12 forming a tenacious seal between the chromium oxide and the glass. Further, as shown in FIG. 2 the base 14 is fused about the bead 16 thereby forming a unitary seal between the envelop 11 and the lead 12. It is noted that the bead of glass and the glass of which the envelope 11 is made are of the same type and thermal expansion thereby ensuring a complete fusion between the bead portion and the envelope 11.

Though as shown in FIG. 1, the leads 12 incorporating this invention have been embodied in a receiving type of tube, it is noted that this invention is applicable to a great variety of electron discharge devices such as the image orthicon tube type No. 5820, made by the assignee of this invention. Further, the glass-to-metal seal described herein may not only be applied to terminal leads for vacuum tube devices, but also to any situation wherein there is a necessity of providing a strong glass-to-metal seal.

Therefore, it may be seen that there has been disclosed a strong and durable metal-to-glass seal which avoids the problem of embrittlement of the molybdenum lead.

While there have been shown and described what is at present considered to be the preferred embodiments of the invention, modifications thereto will readily occur to those skilled in the art. It is not desired, therefore, that the invention be limited to the specific arrangement shown and described and it is intended to cover in the appended claims all such modifications as wall within the true spirit and scope of the invention.

I claim as my invention:

1. A glass-to-metal seal comprising a glass member, a metal member selected from the group consisting of molybdenum, tungsten ferrous metals, and alloys thereof, a first layer of an alloy of chromium and a substance selected from the group consisting of nickel, iron and cobalt, and a second layer of chromium oxide disposed upon said first layer, said second layer being bonded to said glass member.

2. A method of bonding a glass member to a metal member comprising the steps of cleaning the surface of said metal member; applying a coating of a chromium oxide and a metal oxide selected from a group consisting of nickel, cobalt and iron, to said metal member; subjecting said coating to heat in a reducing atmosphere to reduce and fuse said coating to form a layer of an alloy of said metals; subjecting said layer to heat in an oxidizing medium to form a region of chromium oxide from said layer, and bonding said glass member to said region.

3. The method of forming a durable layer on a metal member comprising the steps of:
    (a) applying to said metal member a coating of chromium oxide and an oxide of a metal selected from the group consisting of nickel, cobalt and iron;
    (b) subjecting said coating to heat in a reducing atmosphere to produce a first layer of an alloy of chromium and said metal on said metal member;
    (c) oxidizing said first layer to produce a second layer of chromium oxide thereon.

4. The method of bonding a metal member made of molybdenum to a glass member comprising the steps of:
    (a) cleaning said metal member;
    (b) applying to said metal member a layer of not more than 50% chromium oxide and not more than 85% nickel in the form of a slurry;
    (c) subjecting said layer to heat in a reducing atmosphere to form an alloy of nickel and chrome on said metal member;
    (d) oxidizing said layer to form a region of chromium oxide from said layer;
    (e) bonding said glass member to said region of chromium oxide.

5. The method of bonding a metal member made of molybdenum to a glass member comprising the steps of:
    (a) etching said metal member in solution of potassium hydroxide and potassium ferricyanide;
    (b) applying to said metal member a mixture of 77% nickel oxide and 23% chromium oxide slurried in 1% nitrocellulose in a N-butyl acetate vehicle;
    (c) sintering said mixture in a dry reducing atmosphere at a temperature of approximately 1100° C. for a period of approximately 10 minutes to produce a first layer of an alloy of nickel and chrome;
    (d) placing said first layer in a reducing atmosphere having a water content of approximately +10° C. dewpoint for a period of approximately 5 minutes at a temperature of approximately 1100° C. to preferentially oxidize a second layer of chromium oxide from and about said first layer;
    (e) bonding said glass member to said second layer.

6. The method of bonding a metal member made of molybdenum to a glass member comprising the steps of:
    (a) cleaning said metal member;

(b) applying to said metal member a first layer of chromium oxide and nickel oxide suspended in a slurry medium;
(c) subjecting said first layer to a temperature of not less than 1050° C. for a period of not more than 30 minutes to provide an alloy of nickel and chromium upon said metal member;
(d) subjecting said first layer to a temperature of not less than 1000° C. for a period not greater than 15 minutes in a reducing atmosphere having a water content not exceeding +25° C. dewpoint to preferentially oxidize a second layer of chromium oxide on said first layer,
(e) bonding said glass member to said second layer.

7. The method of bonding a glass member to a metal member selected from the group consisting of molybdenum, tungsten, ferrous metals, and alloys of said metals comprising the steps of:
(a) cleaning said metal member;
(b) applying to said metal member chromium oxide and an oxide of a given metal selected from the group consisting of nickel, iron, and cobalt suspended in a slurry vehicle;
(c) subjecting said metal member to heat in a reducing atmosphere to form a layer of an alloy of said chromium and said given metal;
(d) subjecting said layer to an oxidizing medium to provide a surface region of chromium oxide about said metal member;
(e) bonding said glass member to said surface region.

References Cited
UNITED STATES PATENTS

| | | | |
|---|---|---|---|
| 2,502,855 | 4/1950 | Kingston | 65—43 |
| 2,763,920 | 9/1956 | Turner | 29—198 |
| 2,763,921 | 9/1956 | Turner | 29—198 |
| 2,952,904 | 9/1960 | Hann | 29—198 |
| 3,116,981 | 1/1964 | Sayre | 29—198 |
| 3,117,846 | 1/1964 | Chao | 29—195 |
| 2,893,891 | 7/1959 | Bradstreet et al. | 117—22 |
| 2,994,654 | 8/1961 | Fahnoe | 117—22 |

OTHER REFERENCES

Partridge: Glass to Metal Seals, pub. by the Soc. of Glass Tech., Sheffield, England, 1949, pp. 81–82.

DONALL H. SYLVESTER, *Primary Examiner.*
R. LINDSAY, *Assistant Examiner.*